(12) United States Patent
Raisch et al.

(10) Patent No.: US 6,715,818 B2
(45) Date of Patent: Apr. 6, 2004

(54) SEALING ELEMENT PARTICULARLY FOR A MOVABLE ROOF SECTION OF A VEHICLE

(75) Inventors: Dieter Raisch, Rutesheim (DE); Reiner Hess, Balingen-Ostdorf (DE)

(73) Assignee: CTS Fahrzeug-Dachsysteme GmbH, Hamburg (DE)

( * ) Notice: Subject to any disclaimer, the term of this patent is extended or adjusted under 35 U.S.C. 154(b) by 0 days.

(21) Appl. No.: 10/147,845

(22) Filed: May 14, 2002

(65) Prior Publication Data

US 2002/0171257 A1 Nov. 21, 2002

(30) Foreign Application Priority Data

May 15, 2001 (DE) .......................................... 101 23 702

(51) Int. Cl.⁷ ................................................. B60J 10/00
(52) U.S. Cl. ............................ 296/107.04; 296/107.07; 296/208; 296/93
(58) Field of Search ..................... 296/107.04, 107.05, 296/107.07, 208, 201, 93, 146.14; 49/475.1, 482.1, 483.1; 277/590, 628, 644, 637, 641, 642

(56) References Cited

U.S. PATENT DOCUMENTS 3,653,711 A * 4/1972 De Claire et al.
5,488,805 A * 2/1996 Mass
5,755,071 A    5/1998 Drozd
6,007,140 A * 12/1999 Heitmann et al.

FOREIGN PATENT DOCUMENTS

| DE | 35 00 436   | 8/1985  |
|----|-------------|---------|
| DE | 691 11 020  | 4/1992  |
| DE | 44 41 667   | 12/1995 |
| EP | 0 654 372   | 5/1995  |
| FR | 2 747 172   | 10/1997 |
| WO | WO 97/17221 | 5/1997  |
| WO | WO 98/26949 | 6/1998  |

\* cited by examiner

Primary Examiner—D. Glenn Dayoan
Assistant Examiner—Patricia L. Engle
(74) Attorney, Agent, or Firm—Klaus J. Bach

(57) ABSTRACT

In a sealing element for a movable roof section of a vehicle which seal element includes a pocket delimited by a sealing wall of the sealing element and is open toward one side for receiving cables, a cable guide channel is formed on the inside of the sealing wall so as to be accessible by way of the open side of the pocket and a sealing lip extends over the open side of the pocket and forms, between the outside of the sealing wall and the sealing lip, a seal channel for receiving a part of the movable roof section when the movable roof section is closed.

8 Claims, 2 Drawing Sheets

SEALING ELEMENT PARTICULARLY FOR A MOVABLE ROOF SECTION OF A VEHICLE

BACKGROUND OF THE INVENTION

The invention relates to a sealing element particularly for a movable roof section of a vehicle, with a pocket formed in the sealing element which pocket is delimited by a sealing wall and open toward one side.

DE 44 41 667 C1 discloses a sealing element which, in a folding roof, that is movable between an open position and a closed position in which the passenger space is covered, is arranged in a seal gap between the vehicle roof and the vehicle body. In the closed position of the vehicle roof, the sealing element is intended to provide for a wind-, pressure-, and particularly water-tight closing of the roof. For its mounting to a web of the vehicle body, the sealing element includes a clamping section in the form of a U-shaped reception space into which rubber lips extend which are formed integrally with a sealing wall and which apply to the web inserted into the reception space a clamping force which counteracts inadvertent release of the sealing element from the web.

Since, generally, cables extend particularly through the are in which the sealing gap is provided, for example for supplying power to an electric motor, for supplying hydraulic fluid to a hydraulic actuator or for operating a roof element movably supported in a roof opening, care must be taken that, in the closed position of the vehicle roof, the cables do not form obstacles in the sealing gap by which the sealing capability can be detrimentally affected. The cables must therefore be arranged at a distance from the sealing gap and must be fixed in position by suitable mounting elements. Otherwise, gaps may form between the sealing surfaces of the sealing element and the cable through which water may enter the vehicle interior.

DE 691 11 020 T2 discloses a sealing structure for an engine compartment of a motor vehicle which includes a seal member with a pocket for the reception of the cables. The pocket may be disposed at the inside or at the outside of the seal member. In a first embodiment, the pocket is circular and forms a closed channel. In a second embodiment, the pocket is partially circular and provided with a radial insert opening for the insertion of the cable. In both embodiments, the pocket forms a cable guide channel, which however includes no means for preventing an unintended release of the cable from the guide channel.

Particularly with the partially open pocket, the cable may move out of the guide channel as a result of vibrations so that the cable then moves in an uncontrollable manner and may be damaged.

DE 691 11 020 T2 discloses an embodiment wherein the receiver pocket is arranged at the inside within a cavity of the seal member. In this embodiment, the cable can be inserted into the cable guide channel in the receiver pocket only by way of the axial ends, not from a side thereof. The installation of the cable is therefore very difficult.

It is the object of the present invention to provide such a seal structure wherein power supply cables or drive cables for a movable vehicle roof can be easily installed without detrimentally affecting the sealing functions of the seal structure.

SUMMARY OF THE INVENTION

In a sealing element for a movable roof section of a vehicle which seal element includes a pocket delimited by a sealing wall of the sealing element and is open toward one side for receiving cables, a cable guide channel is formed on the inside of the sealing wall so as to be accessible by way of the open side of the pocket and a sealing lip extends over the open side of the pocket and forms, between the outside of the sealing wall and the sealing lip, a seal channel for receiving a part of the movable roof section when the movable roof section is closed.

The seal member includes a sidewardly open pocket, which has generally a U-shaped cross-section and is limited by a sealing wall of the sealing element. Within the pocket, a cable guide channel is provided into which a cable may be inserted by way of the open side of the pocket. Such a design permits a secure integration of a cable into the sealing element in such a way that the sealing element assumes, in addition to its sealing function also a retaining function for the cable whereby separate mounting elements for fixing the cable to the roof section or the vehicle body are not needed. The cable is securely retained in the sealing element since the cable guide channel is arranged within the receiver pocket in the sealing element so that even if the cable is unintentionally released from the cable guide channel, it is still within the receiver pocket of the sealing element. In this way, a sufficiently secure retaining structure is provided which prevents a the full release of the cable so that the cable will in no case hang down from the roof in the arc of the roof opening.

Expediently, the cable may be engaged in the cable guide channel in a form-fitting manner. The guide channel may, for example, be adapted to the form of the cable and may be open only partially along the side thereof to permit the insertion of the cable into the cable guide channel. The form-locking engagement however may be achieved also by way of a rubber lip, which is preferably formed integrally with the seal element and which delimits the cable guide channel at one side thereof. In order to improve the clamping effect, the rubber lip may be inclined in the direction toward the bottom of the receiving pocket, whereby the cable is more firmly held in the cable guide channel and is engaged therein with an increased clamping force. However, the cable guide channel may also be delimited by a rubber lip at two sides thereof.

The receiving pocket is delimited by a sealing wall, on which the cable guide channel is formed within the receiving pocket. The outer side of the sealing wall remote from the receiving pocket of the sealing wall may form a seal surface, which is engaged in the seal position by a component to be sealed.

Advantageously at least two cable guide channels are provided in the receiving pocket which may for example both be separated by a common rubber lip. The two cable guide channels may be arranged behind one another between the bottom of the receiving pocket and the insertion side of the receiving pocket opposite the bottom. The wall sections or rubber lips separating the cable guide channels form an obstacle for the installed cable and prevent an unintended release of the cable from the receiving pocket.

In order to increase the stability, a reinforcement strip may be inserted into the seal wall, which delimits the receiving pocket.

Further advantages and suitable embodiments of the invention will become apparent from the following description of the invention on the basis of the accompanying drawings.

DESCRIPTION OF EMBODIMENTS

Figure 1:
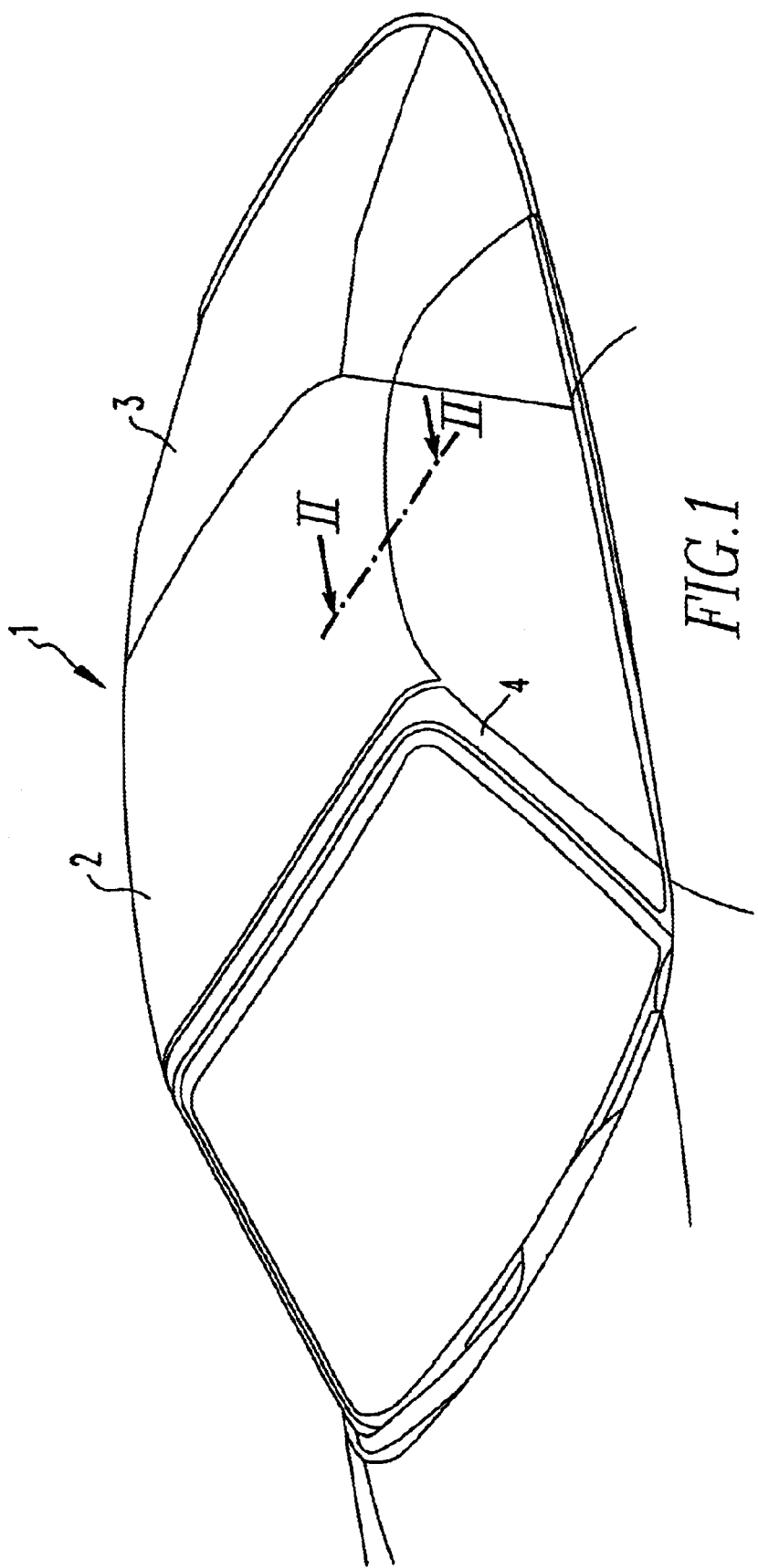
FIG. 1 is a perspective view of a movable vehicle roof wherein sealing elements are provided for sealing the gaps between the movable roof parts and the vehicle body parts.

In the following description, identical parts are designated by the same reference numerals.

The convertible vehicle shown in FIG. 1 includes a vehicle top, which is movable between the shown closed position in which the vehicle interior is covered by the roof and a storage position in which the vehicle interior is open.

In the shown embodiment, the vehicle roof is in the form of a hardtop roof including a front roof part 2 and a rear roof part 3, which are each rigid and which are movable between the closed and open positions by way of a kinematic operating mechanism.

For sealing gaps between the movable roof parts of the vehicle roof 1 and stationary vehicle body parts, for example, the windshield frame 4, sealing elements are provided by way of which a wind-, water-, and, possibly also pressure-tight connection can be provided.

Figure 2:
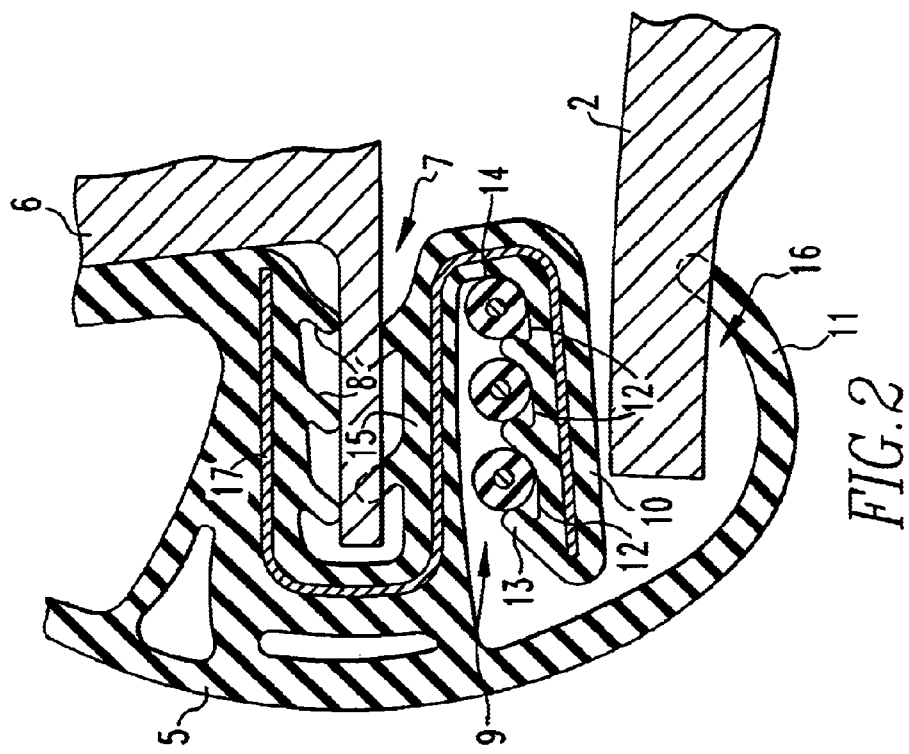
FIG. 2 is an enlarged cross-sectional view taken along line II—II of FIG. 1.

The seal element 5 shown in FIG. 2 disposed in a seal gap between the movable vehicle roof and a vehicle body associated vehicle component is supported on the vehicle body by a web 6, which is mounted to the windshield frame. The web 6 extends into a clamping section 7 of the sealing element 5, that is, into the clamping space defined by spaced side walls from which clamping lips 8 formed integrally with the spaced side walls project toward each other to firmly engage the web portion 6 received therebetween. The clamping lips 8 engage the section of the web 6 received therebetween with a sufficiently high clamping force to firmly hold the sealing element 5 on the web portion 6.

The sealing element 5 further includes a receiving pocket 9 for accommodating cables 14 which may be for example electric power supply cables or hydraulic fluid supply lines. The cables 14 are held in position on the vehicle body by the sealing element 5. The sealing element 5, in addition to forming a seal, also has to firmly engage the cable so that no mounting means are needed for mounting the cable to the vehicle body when the cable is held by the sealing element.

The receiving pocket 9 has an essentially U-shaped cross-section delimited at one side by a seal wall 15 extending between the receiving pocket 9 and the adjacent clamping section 7. At the side remote from the clamping section 7, the receiving pocket 9 is delimited by an outer seal wall 10 of the sealing element 5. The cable guide channels 12 are arranged at the inner side of this outer seal wall 10 and delimited each by a rubber lip 13, which is formed integrally with the outer seal wall 10. The rubber lips 13 are inclined toward the inner end of the pocket 9 so that the cables 14 can be easily inserted into the pocket 9 but are restrained by the rubber lips 13 from being released from the pocket 9 as the resistance of the rubber lips against their release from the cable guide channels 12 is increased. In the embodiment shown in FIG. 2, three cable guide channels 12 are provided which are disposed alongside one another on the seal wall 10.

Furthermore, a sealing lip 11 is provided which extends over the pocket 9 and the outer seal wall 10 of the pocket 9 in spaced relationship from the seal wall 10. The space between the seal wall 10 and the sealing lip 11 acts as a seal chamber 16 into which the movable roof part of the vehicle extends and on which the free front end of the sealing lip 11 is disposed. The sealing lip 11 extends over the opening of the pocket 9 for the cable 14 and, in this way, forms an additional seal wall delimiting the pocket 9. The seal chamber 16, the pocket 9 and the clamping section 7 are arranged one after the other in a row within the sealing element 5. The insertion openings of the seal chamber 16, the pocket 9 and the clamping section 7 are disposed alternately at opposite sides.

For improving the rigidity and the sealing properties and for increasing the clamping forces, a reinforcement sheet 17 may be disposed in the seal element 5, which is essentially S-shaped and which extends around the U-shaped clamping section 7 as well as the U-shaped pocket 9.

The outer sealing wall 10 of the pocket 9 forms at its outer side adjacent the seal chamber 16 a sealing surface, which is engaged by the roof part 2 when the roof is closed.

Figure 3:
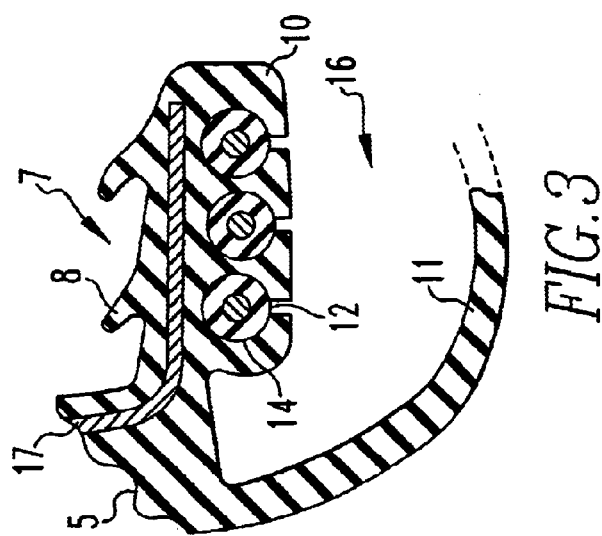
FIG. 3 shows another embodiment of a seal element.

In the embodiment according to FIG. 3, the cable guide channels 12 are in the form of recesses in the seal element 5, wherein the recesses include insert openings which can be opened for the insertion of the cable 14 into the cable guide channels 12. After the insertion of the cable 14, the insert openings close again because of the elasticity of the seal material so that the cables are retained in the cable guide channels 12 in a form-fitting manner. The sealing lip 11 extends over the sealing wall 10, which contains the cable guide channels 12. The sealing lip 11 delimits the seal chamber 16 for the movable vehicle roof section wherein the seal chamber 16 is identical with the pocket 9 for the cable 14. The sealing lip 11 therefore forms at the same time, an outer seal wall for delimiting the channels receiving the cable 14.

The sealing element may be disposed in various vehicle roofs, which are movable between closed and open positions. In addition to the use in hardtop vehicle roofs as demonstrated herein the seal element may also be used in connection with folding roofs, with lamella roofs and with sliding roofs.

What is claimed is:

1. A seal element for a movable roof section of a vehicle, including a sealing wall delimiting a pocket and having an outside forming a sealing surface, said pocket being open toward one side for receiving cables, at least one cable guide channel formed in said sealing wall so as to be accessible by way of the open side of said pocket, a cable individually and firmly supported in said at least one cable guide channel and a sealing lip extending over said pocket and forming between the outside of said sealing wall and said sealing lip a seal chamber for receiving a part of said movable roof section when said movable roof section is closed.

2. A seal element according to claim 1, wherein said cable guide channel is delimited by a rubber lip.

3. A seal element according to claim 2, wherein said rubber lip is formed integrally with said sealing wall.

4. A seal element according to claim 2, wherein said rubber lip is inclined toward the inner end of said pocket.

5. A seal element according to claim 1, wherein at least two cable guide channels are formed in said sealing wall.

6. A seal element according to claim 5, wherein two adjacent guide channels are separated by a common rubber lip.

7. A seal element according to claim 5, wherein said cable guide channels are arranged, one behind the other.

8. A seal element according to claim 1, wherein a reinforcement plate is disposed in said sealing wall.

* * * * *